United States Patent
Vincon et al.

(10) Patent No.: US 11,543,016 B2
(45) Date of Patent: Jan. 3, 2023

(54) DRIVE DEVICE FOR A MOTOR VEHICLE HAVING A DRIVE UNIT

(71) Applicant: Daimler AG, Stuttgart (DE)

(72) Inventors: Florian Vincon, Stuttgart (DE); Guenter Niebauer, Hochdorf (DE)

(73) Assignee: Daimler Truck AG, Leinfelden-Echterdingen (DE)

( * ) Notice: Subject to any disclaimer, the term of this patent is extended or adjusted under 35 U.S.C. 154(b) by 0 days.

(21) Appl. No.: 17/298,240

(22) PCT Filed: Nov. 22, 2019

(86) PCT No.: PCT/EP2019/082168
§ 371 (c)(1),
(2) Date: May 28, 2021

(87) PCT Pub. No.: WO2020/109144
PCT Pub. Date: Jun. 4, 2020

(65) Prior Publication Data
US 2022/0112945 A1    Apr. 14, 2022

(30) Foreign Application Priority Data
Nov. 29, 2018 (DE) ...................... 10 2018 009 398.1

(51) Int. Cl.
*F16H 57/08* (2006.01)
*F16H 57/023* (2012.01)
(Continued)

(52) U.S. Cl.
CPC ............. *F16H 57/023* (2013.01); *F16H 1/32* (2013.01); *F16H 57/08* (2013.01); *F16H 57/021* (2013.01); *F16H 2057/085* (2013.01)

(58) Field of Classification Search
CPC .......... F16H 57/023; F16H 1/32; F16H 57/08; F16H 2057/085; F16H 57/0037; F16H 57/021; F16H 57/0018
See application file for complete search history.

(56) References Cited

U.S. PATENT DOCUMENTS

| | | | | |
|---|---|---|---|---|
| 4,334,590 A | * | 6/1982 | Plumb ................. | B60K 17/046 180/385 |
| 4,677,873 A | * | 7/1987 | Eastman ............ | B60K 17/3467 475/221 |

(Continued)

FOREIGN PATENT DOCUMENTS

| | | | |
|---|---|---|---|
| CN | 105276095 A | * | 1/2016 |
| DE | 10 2011 007 253 A1 | | 10/2012 |

(Continued)

OTHER PUBLICATIONS

PCT/EP2019/082168, International Search Report dated Feb. 26, 2020 (Two (2) pages).

*Primary Examiner* — Sherry L Estremsky
(74) *Attorney, Agent, or Firm* — Crowell & Moring LLP

(57) ABSTRACT

A drive device for a motor vehicle includes a drive unit with a driveshaft, a housing, and a planetary gear set disposed in the housing with a sun gear. A connection device allows relative movements, running in an axial direction of the driveshaft, between the sun gear and the driveshaft, via which the sun gear is drivable by the driveshaft. An axial bearing has a roller bearing for axially mounting the sun gear where the axial bearing is disposed in the axial direction between the drive unit and the planetary gear set. A bearing casing formed separately from the housing supports the roller bearing in the axial direction via an outer ring of the roller bearing non-rotationally connected to the bearing casing and the bearing casing is connected axially fixedly to the housing.

9 Claims, 2 Drawing Sheets

(51) Int. Cl.
*F16H 1/32* (2006.01)
*F16H 57/021* (2012.01)

(56) References Cited

U.S. PATENT DOCUMENTS 5,370,014 A * 12/1994 Pigozzi ................ F16H 37/042
74/606 R
9,022,890 B2 * 5/2015 Smetana ................ F16D 3/06
475/149

FOREIGN PATENT DOCUMENTS

| | | | |
|---|---|---|---|
| DE | 10 2016 221 708 A1 | 6/2017 | |
| DE | 102016220952 A1 * | 4/2018 | ............ F16H 3/56 |
| EP | 0591908 A1 * | 4/1994 | |
| WO | WO 2017/101920 A1 | 6/2017 | |

* cited by examiner

DRIVE DEVICE FOR A MOTOR VEHICLE HAVING A DRIVE UNIT

BACKGROUND AND SUMMARY OF THE INVENTION

The invention relates to a drive device for a motor vehicle.

Such a drive device for a motor vehicle is already known, for example, from DE 10 2016 221 708 A1 or WO 2017/101920 A1. The drive device has a drive unit that comprises a driveshaft. The drive unit can provide torques via the driveshaft. Furthermore, the drive device comprises a housing and a planetary gear set arranged in the housing. The planetary gear set comprises a sun gear. Moreover, the drive device has a connection device that allows relative movements, running overall in the axial direction of the driveshaft and thus the drive device, between the sun gear and the driveshaft. Here, the sun gear can be driven by the driveshaft via the connection device. Moreover, the drive device comprises at least one axial bearing for axially bearing the sun gear. Here, the axial bearing comprises at least one roller bearing.

The object of the present invention is to develop a drive device of the kind mentioned above in such a way that a particularly advantageous axial bearing of the sun gear can be implemented.

In order to develop a drive device of the kind mentioned herein in such a way that a particularly advantageous axial bearing of the sun gear can be implemented, it is provided according to the invention that the axial bearing is arranged between the drive unit and the planetary gear set in the axial direction. Moreover, the axial bearing has a bearing casing formed separately from the housing, on which bearing casing the roller bearing is supported in the axial direction via its outer ring non-rotationally connected to the bearing casing. Furthermore, according to the invention, the bearing casing is fixedly connected to the housing in an axial manner. Thus, axial forces, which act on the roller bearing from the sun gear, can advantageously be transferred to the housing via the outer ring. Thus, with the drive device according to the invention, the reaction forces from the planetary gear set can advantageously be received or supported in the housing and do not have to be received by the functional components of the drive device, such that a load of the drive device according to the invention is minimal even with the sun gear rotational speeds that are particularly high in comparison with drive devices with an internal combustion engine drive, whereby component attrition can be lowered and/or a lifetime can be increased.

In a design of the invention, the bearing casing is secured at least indirectly in the housing via a second connection device, wherein the second connection device allows relative movements, running in the radial direction, between the bearing casing and the housing. Advantageously, with this design of the invention, a common and ball bearing, in particular a four-point bearing, particularly preferably a cost-effective and easily mountable deep groove ball bearing, can be used as the roller bearing.

In a further design of the invention, a support element, formed separately from the housing and separately from the bearing casing and fixed at least indirectly on the housing, is provided, on which support element the bearing casing is axially fixed. The support element is fixed at least indirectly, in particular directly, on the housing, in particular connected to the housing. The feature that the support element is fixed at least indirectly on the housing can be understood to mean that the support element is secured on the housing against movements carried out or running in relation to the housing. Thus, translational and/or rotational relative movements, for example, between the support element and housing cease. In the context of the invention, the support element can be designed, for example, as a support plate.

In a further design of the invention, a hollow gear of the planetary gear set of the drive device according to the invention is fixed on the housing via the support element and thus secured against rotations carried out in relation to the housing. The planetary gear set here further has at least one planetary support, on which at least one or more planetary gears of the planetary gear set can be rotatably mounted. Here, at least one or more planetary gears simultaneously mesh with the sun gear and with the hollow gear. In a further design of the invention, the hollow gear and the support element are formed integrally. With high production quantities, this design of the invention can advantageously be produced in a manner that saves construction space, saves weight and is cost-effective.

In an advantageous design of the invention, it is provided that the outer ring is supported directly on the bearing casing in the radial direction and/or directly on the bearing casing in the axial direction. Advantageously, in this design of the invention, the bearing casing constitutes a rigid bearing housing for the roller bearing, such that attrition of the roller bearing can be lowered and a lifetime of the roller bearing can be increased.

In an advantageous design of the invention, a securing plate formed separately from the bearing casing and separately from the housing and fixed at least indirectly on the housing is provided, by means of which securing plate the bearing casing is secured against relative movements carried out in relation to the housing, wherein the securing plate is fixed on the support element. The feature that the securing plate is fixed at least indirectly on the housing can be understood, in particular, to mean that the securing plate is secured against relative movements, running in the axial direction and/or in the radial direction, between the securing plate and the housing.

In a design of the invention, the second connection device secures the bearing casing with the securing plate on the support element. The bearing casing is non-rotationally connected to the securing plate, in particular by means of the second connection device. Thus, by means of the second connection device, relative rotations between the bearing casing and the securing plate can be avoided, yet according to the invention, the second connection device allows relative movements, running in the radial direction, between the bearing casing and the securing plate. Thus, the roller bearing is or becomes freely suspended in the radial direction via the bearing casing and the securing plate, such that axial forces acting on the axial bearing from the sun gear can be received or supported on or via the axial bearing, yet the axial bearing can be prevented from impeding a radial bearing of the sun gear in an unwanted manner. Moreover, as a result of the radial movability of the bearing casing in relation to the securing plate, a particularly advantageous degree of tolerance compensation can be implemented.

In an advantageous design of the invention, it is provided that the second connection device has grooves provided on the bearing casing and lugs provided on the securing plate, which engage in the grooves.

Furthermore, it is conceivable that the second connection device allows relative movements, running or carried out in the axial direction, between the bearing casing and the securing plate, at least in a predetermined or predeterminable region. In doing so, a particularly advantageous degree of tolerance compensation can be ensured.

Alternatively or additionally, rotational and/or translational relative movements, for example, between the securing plate and the housing cease. Moreover, it is preferably provided that rotational and/or translational relative movements between the support element and the securing plate cease. Here, the securing plate is fixed at least indirectly, in particular directly, on the support element. In particular, the securing plate can be fixed on the support element in such a way that the securing plate is screwed to the support element.

Overall, it is conceivable that the roller bearing, in particular its outer ring, the bearing casing referred to simply as casing, the securing plate and the support element form a grouping. Since the hollow gear is, furthermore, connected to the support element, interlocking forces, which emerge in or on the sun gear and the hollow gear or between the sun gear and the hollow gear, can be compensated for via the grouping formed of the roller bearing, in particular the outer ring, bearing casing, securing plate and support element and do not have to additionally be supported via or on the housing. This means that the support element must at least virtually exclusively transfer reaction moments from the planetary gear set to the housing. Thus, a particularly advantageous bearing can be ensured since the construction space requirement and the costs can be kept minimal.

The housing has, for example, at least two housing parts formed separately from each other and connected to each other. Here, the driveshaft is mounted, for example, at least radially on a first of the housing parts, wherein the planetary gear set, for example, is mounted at least radially on the second housing part. The axial bearing is arranged, for example, on or in the first housing part or on or in the second housing part. With the drive device, an advantageous degree of tolerance compensation can be ensured both in the radial direction and in the axial direction, such that the driveshaft and the planetary gear set can be mounted particularly well, although the housing parts formed separately from one another are used. However, the housing parts allow a mounting of the drive device that is simple and thus time- and cost-effective overall. Here, the grouping enables compensation for excessive reaction forces out of the respective interlocking of the planetary gear set and to not have to introduce them into the housing.

Further advantages, features and details of the invention emerge from the below description of a preferred exemplary embodiment and by means of the drawings. The features and feature combinations mentioned in the description above and the features and feature combinations mentioned in description of the figures below and/or only shown in the figures can be used not only in the respectively specified combination, but also in other combinations or on their own without leaving the scope of the invention.

DETAILED DESCRIPTION OF THE DRAWINGS

Figure 1:
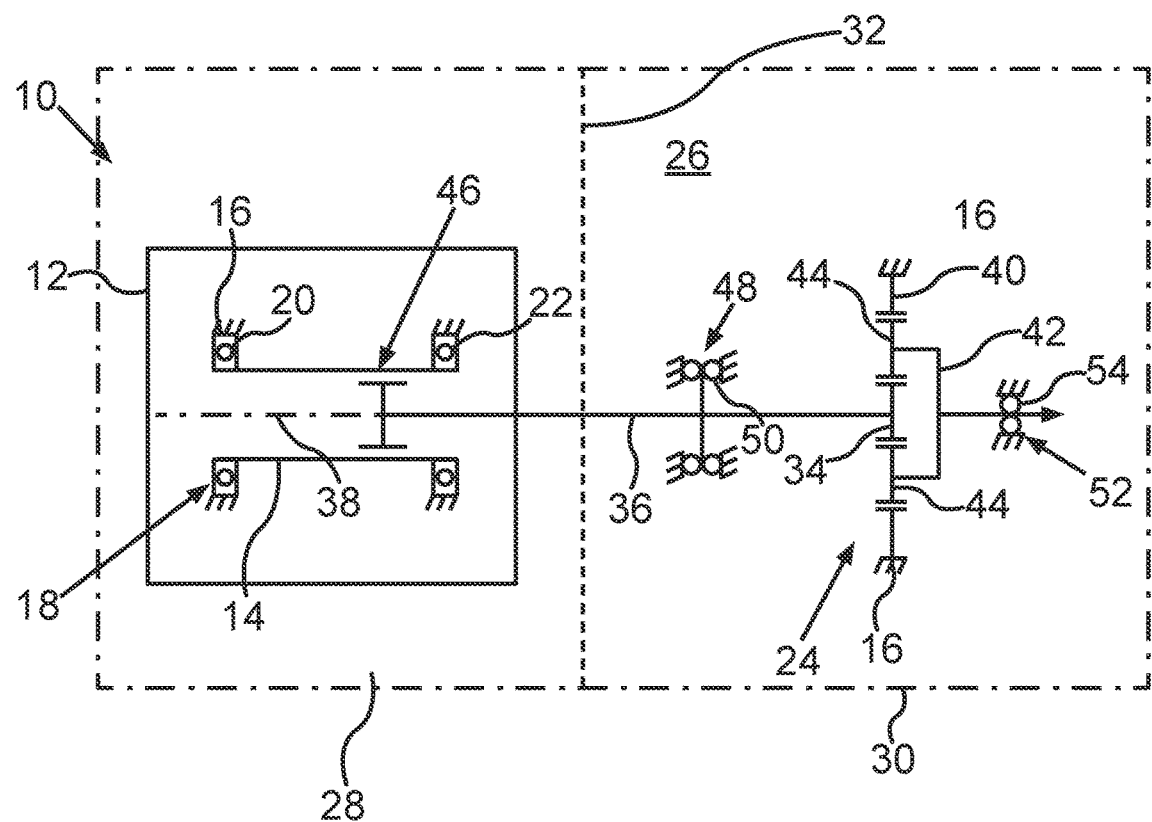
FIG. 1 is a schematic depiction of a drive device according to the invention for a motor vehicle, in particular for a commercial vehicle.

In the Figures, the same or functionally identical elements are provided with the same reference numerals.

In a schematic depiction, FIG. 1 shows a drive device 10 for a motor vehicle, in particular a commercial vehicle. The motor vehicle can be driven by means of the drive device 10, for example, in particular electrically. To do so, the drive device 10 comprises a drive unit 12, by means of which the motor vehicle can be driven, for example. The drive unit 12 is formed, for example, as an electric engine, by means of which respective gears of the motor vehicle and thus the motor vehicle as a whole can be driven electrically.

The drive unit 12 has a driveshaft 14, also referred to as an output shaft, via which the drive unit 12 can provide torques for driving the gears or the motor vehicle. The drive device 10 also comprises a housing 16 depicted particularly schematically in FIG. 1, in which the drive unit 12 and/or the driveshaft 14, for example, are respectively arranged at least partially, in particular at least extensively or completely. Here, a bearing device 18 is provided, which has at least two bearings 20 and 22 overall spaced apart from each other in the axial direction of the driveshaft 14 and thus the drive device 10. The bearings 20 and 22 are formed, for example, as a roller bearing, in particular as a ball bearing. The driveshaft 14 is rotatably mounted on the housing 16 via the bearing device 18, in particular via the bearings 20 and 22, at least in the radial direction of the driveshaft 14 and thus in the radial direction of the drive device 10 overall.

Moreover, the drive device 10 comprises a planetary gear set 24 arranged in the housing 16, the planetary gear set also being referred to as a planetary set. Overall, it is conceivable that the housing 16 forms or delimits a receiving chamber 26, for example, in which the planetary gear set 24, for example, is arranged. In the exemplary embodiment illustrated in FIG. 1, the housing 16 has a first housing part 28 and a second housing part 30. The housing parts 28 and 30 are formed separately from each other and are connected to each other along a separating plane 32. In other words, a separating gap, for example, along which the housing parts 28 and 30 are supported on each other at least indirectly, in particular directly, runs on the separating plane 32. In other words, the housing parts 28 and 30 are supported on one another on the separating plane 32 at least indirectly, in particular directly. Here, the housing part 28 delimits a first part of the receiving chamber 26, and the housing part 30 delimits a second part of the receiving chamber 26. The housing parts 28 and 30 formed separately from each other and connected to each other enable a production or mounting of the drive device 10 which is particularly simple and thus time- and cost-effective.

The planetary gear set 24 has a sun gear 34, which is presently arranged in the housing part 30. The sun gear 34 has a sun shaft 36, which is arranged coaxially to the driveshaft 14 formed as hollow shaft, for example. Here, the driveshaft 14 and the sun shaft 36 and thus the sun gear 34 can be rotated around an axis of rotation 38 in relation to the housing 16. For example, at least one longitudinal region of the sun shaft 36 is received in the driveshaft 14. Moreover, the planetary gear set 24 has a hollow gear 40 and a planetary support 42. Moreover, the planetary gear set 24 has planetary gears 44, which are mounted rotatably on the planetary support 42 and, at the same time, mesh with the sun gear 34 and with the hollow gear 40. The planetary support 42 can be rotated around the axis of rotation 38 in relation to the housing 16. In contrast, however, the hollow gear 40 is fixedly connected to the housing 16, such that the hollow gear 40 is fixed to the housing 16. Thus, the hollow gear 40 is secured against relative movements carried out in the axial direction and in the radial direction and in relation to the housing 16.

The driveshaft 14 and the sun shaft 36 are shafts formed separately from each other, which are nevertheless coupled to each other in such a way that the sun shaft 36 and thus the sun gear 34 can be driven by the driveshaft 14. To do so, the drive device 10 comprises a first connection device 46, which allows relative movements, running or carried out in the axial direction of the driveshaft 14 and thus the drive device 10, between the sun gear 34 and the driveshaft 14. Here, the sun gear 34 can be driven by the driveshaft 14 via the first connection device 46, such that the shafts are coupled to each other via the first connection device 46 in a manner so as to transfer torque. In particular, the sun shaft 36 and thus the sun gear 34 are coupled in a positive locking manner to the driveshaft 14 by means of the connection device 46 in a manner so as to transfer torque, such that the sun gear 34 can be driven in a positive locking manner by the driveshaft 14 via the connection device 46.

The connection device 46 is formed, for example, as a spline shaft profile or comprises at least one spline shaft profile, which allows relative movements, carried out in the axial direction, between the shafts and ensures a coupling of the shafts in a manner so as to transfer torque. Moreover, the spline shaft profile or the connection device 46 allows angle errors, in particular between the shafts. Thus, the connection device 46 ensures a particularly advantageous degree of tolerance compensation, which is advantageous, in particular, because the housing 16 comprises housing parts 28 and 30 formed separately from one another and since the drive shaft 14, for example is mounted on or in the housing part 28 and the sun gear 34 on or in the housing part 30.

Torques provided by the drive unit 12 via the driveshaft 14 and thus by the driveshaft 14 can be introduced into the planetary gear set 24 via the sun shaft 36 and thus via the sun gear 34. Here, the planetary support 42 is also referred to as a web. The planetary support 42 is an output of the planetary gear set 24, since the planetary gear set 24 can provide output torques, which are the result of the torques introduced into the planetary gear set 24, via the planetary support 24. Thus, for example, the wheels of the motor vehicle can be driven, in particular electrically, via the planetary support 42 of the drive unit 12.

The connection device 46 also provides a radial positioning of the sun shaft 36 and thus the sun gear 34, such that the sun gear 34, for example, is mounted on the driveshaft 14 in the radial direction via the connection device 46. The sun gear 34 is thus mounted, in particular rotatably, at least in the radial direction on the housing 16 and here on the housing part 28, for example via the bearing device 18, via the driveshaft 14 and via the bearing device 18. Thus, the bearing device 18, the driveshaft 14 and the connection device 46, for example, provide a first radial mounting of the sun gear 34 in the sun shaft 36. The planetary gear set 24 here constitutes a second radial mounting of the sun shaft 36 and here allows relative movements, also carried out in the axial direction, for example, between the sun shaft 36 and the driveshaft 14 and angle errors, in particular between the shafts. Thus, the sun shaft 36 is mounted at least in the radial direction on the housing 16 and here on the housing part 30 via the sun gear 34, the planetary gears 44 and the hollow gear 40.

In order to mount the sun shaft 36 specifically statically, an axial guide in the form of an axial bearing 48 is also provided. Thus, the sun shaft 36 and the sun gear 34 are axially mounted, in particular at least indirectly, on the housing 16 via the axial bearing 48. The axial bearing 48 has at least or exactly one roller bearing 50, via which the sun shaft 36 and the sun gear 34 is axially mounted, in particular on the housing 16.

If the planetary gear set 24 is interlocked obliquely, for example, then interlocking forces, in particular when the drive device 10 is in operation, emerge in the planetary gear set 24. The interlocking forces are also referred to as reaction forces that emerge in respective interlockings of the planetary gear set 24. In particular, the interlocking forces emerge between an oblique interlocking of the sun gear 34 and an oblique interlocking of the planetary gears 44 and/or between the oblique interlocking of the planetary gears 44 and an oblique interlocking or the hollow gear 40. The interlocking forces have a force component running in the axial direction, which is also referred to as an axial force or axial forces. Thus, axial interlocking forces, i.e., axial forces that are the result of interlocking forces of the planetary gear set 24, can be received and supported in or via the axial bearing 48.

In the exemplary embodiment shown in FIG. 1, the axial bearing 48 is arranged in the housing part 30 and thus beyond the separating plane 32, also referred to as the housing separating plane, from the point of view of the drive unit 12. Alternatively, the axial bearing 48 can be arranged in the housing part 28 and thus on this side of the separating plane 32, from the point of view of the drive unit 12. Instead of the roller bearing 50, a four-point bearing or a normal deep groove ball bearing could be used, which can receive any axial forces emerging. Here, it is advantageous when the axial bearing 48, also simply referred to as a bearing, is freely suspended in the radial direction. This is explained below. Moreover, the drive device 10 comprises a second bearing device 52, which comprises at least or exactly one bearing formed, for example, as a roller bearing. The planetary support 42 is mounted rotatably on the housing 16, and here on the housing part 30, in the radial direction by means of the bearing device 52. Here, the axial bearing 48 is arranged between the bearing devices 18 and 52 in the axial direction.

Figure 2:
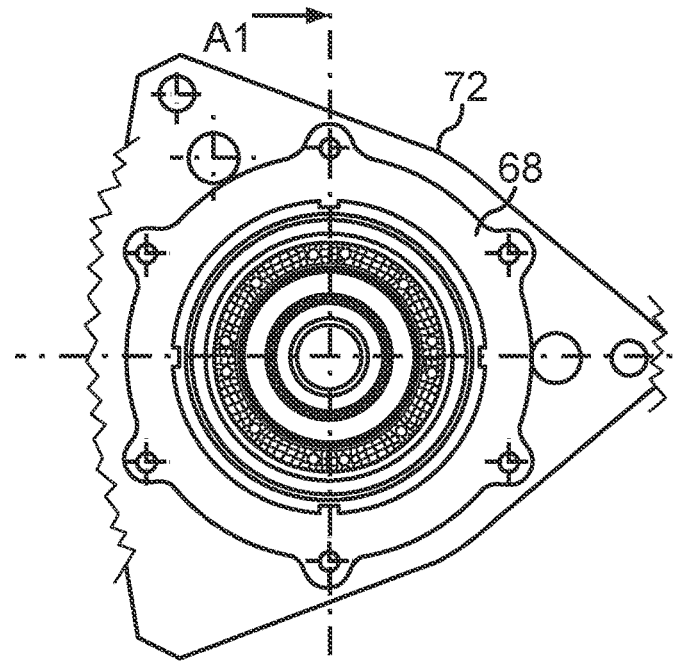
FIG. 2 is a schematic depiction of the drive device.
Figure 3:
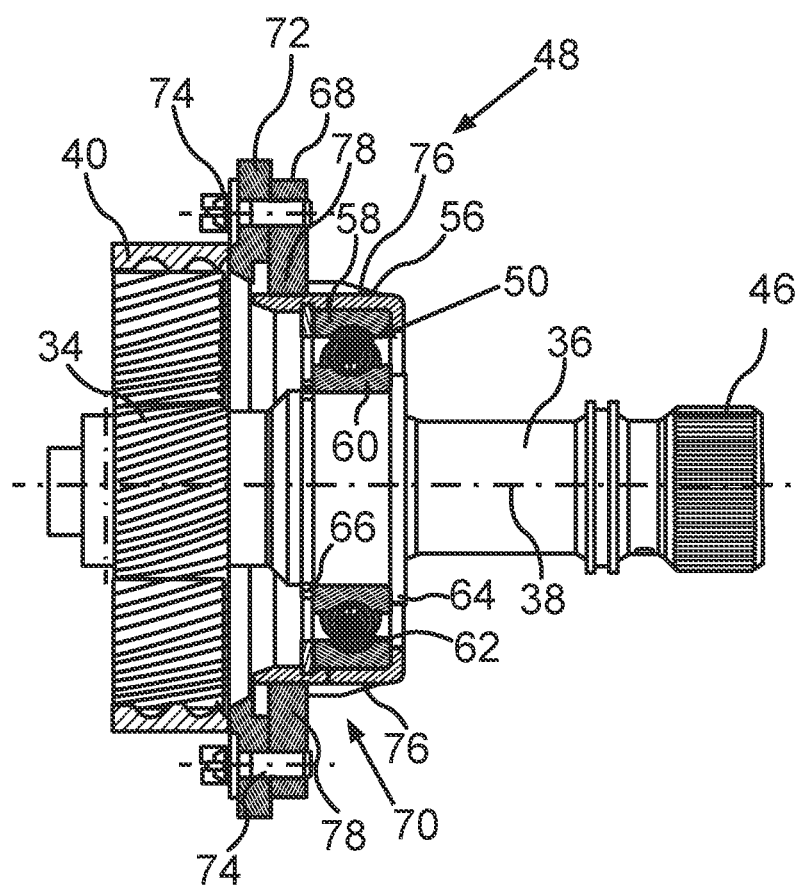
FIG. 3 is a schematic sectional view of the drive device along a sectional line A1-A1 shown in FIG. 2.

In order to now be able to implement a particularly advantageous bearing, in particular axial bearing, the axial bearing 48 is arranged in the axial direction between the drive unit 12 and the planetary gear set 24. Moreover, the axial bearing 48—as can be seen particularly well when FIGS. 2 and 3 are seen together—has a bearing casing 56 formed separately from the housing 16, on which the roller bearing 50 is supported in the axial direction via its outer ring 58 non-rotationally connected to the bearing casing 56. Here, the outer ring 58 is supported directly on the bearing casing 56 in the axial direction. The roller bearing 50 has the outer ring 58 and an inner ring 60. Moreover, the roller bearing 50 comprises a roller body 62. The inner ring 60 is secured on the sun shaft 36 in the axial direction and is supported here, on the one hand, on a collar 64 and on the other hand on a securing ring 66 interacting in a positive locking manner with the sun shaft 36 and thus fixed on the sun shaft 36 in an axial manner.

Moreover, the axial bearing 48 has a securing plate 68 formed separately from the bearing casing 56 and separately from the housing 16 and fixed at least indirectly on the housing 16. Moreover, the axial bearing 48 comprises a second connection device 70, which allows relative movements, running in the radial direction, between the bearing casing 56 and the securing plate 68. By means of the second connection device 70, the bearing casing 56 is secured on the securing plate 68 against relative rotations carried out in relation to the securing plate 68. Thus, the bearing casing 56 cannot be rotated around the axis of rotation 38 in relation to the securing plate 68.

Moreover, the axial bearing 48 comprises a support element formed separately from the housing 16, separately from the securing plate 68 and separately from the bearing casing 56 and fixed at least indirectly, in particular directly, on the housing 16, formed as a support plate 72, on which the hollow gear 40 is fixed. The hollow gear 40 and the support plate 72 are formed, for example, as components formed separately from each other and connected to each other, in particular welded to each other. Moreover, the securing plate 68 is fixed on the support plate 72. Thus, the securing plate 68 is secured, for example, against a relative movement carried out in the axial direction and carried out in relation to the support plate 72, and the securing plate 68 is thus secured against rotations carried out in relation to the support plate 72. In the exemplary embodiment illustrated in the Figures, the securing plate 68 is screwed to the support plate 72 by means of screws 74 and thus fixed on the support plate 72.

In the exemplary embodiment shown in the Figures, the roller bearing 50 is a deep groove ball bearing that is mounted on or in the bearing casing 56 simply referred to as the casing. On its periphery, in particular on its outer periphery, the bearing casing 56 has several grooves 76, spaced apart from one another in the peripheral direction, for example, of the second connection device 70. Moreover, the connection device 70 comprises lugs 78 provided on the securing plate 68, which engage in the corresponding grooves 76. Thus, the bearing casing 56 and thus the outer ring 58 are secured against a distortion in relation to the securing plate 68 and in relation to the housing 16. Here, the bearing casing 56 is secured on the support plate 72 via the securing plate 68 and by means of screws 74 as well as via the connection device 70 in such a way that the bearing casing 56 is mounted moveably or flexibly in the radial direction, in particular in relation to the securing plate 68 and/or in relation to the housing 16. Here, the outer ring 58, for example, is supported directly on the bearing casing 56 outwardly in the radial direction, and/or the inner ring 60 is supported directly on the sun shaft 36 inwardly in the radial direction. Overall, it can be seen that, in doing so, a particularly advantageous degree of tolerance compensation can be ensured both in the radial direction and in the axial direction.

The hollow gear 40 is connected to the support plate 72, such that the interlocking forces emerging in the sun gear 34 and in a hollow gear 40 are compensated for via the grouping formed of the roller bearing 50, bearing casing 56, securing plate 68 and support plate 72 and do not have to be additionally supported via or on the housing 16. This means that the support plate 72 must almost exclusively transfer the reaction moments from the planetary gear set 24 to the housing 16. The outer ring 58 can be supported directly on the support plate 72, for example via the bearing casing 56 and the securing plate 68, such that reaction forces from the interlocking are not introduced into the housing 16. Since the connection device 70 or the bearing casing 56 and the securing plate 68 allow relative movements, carried out in the radial direction, between the securing plate 68 and the bearing casing 56, a radial movability of the roller bearing 50 can be implemented in the radial direction in relation to the housing, wherein the outer ring 58 can simultaneously be supported directly on the bearing casing 56 in the radial direction. Thus, unwanted relative rotation, carried out in relation to the bearing casing 56 or in relation to the housing 16, of the outer ring 58 can be safely avoided. The securing plate 68 and the support plate 72 can be seen particularly well in FIG. 2.

The knowledge underpinning the drive device 10, in particular its design, is that, when mounting individual shafts of a planetary transmission or planetary gear set, care should be taken that the planetary transmission or the planetary gear set is not hyper static. A further requirement can emerge when the shafts or their bearings are arranged in different housing parts. Usually, the housing parts must then be produced very accurately and/or misalignments must be compensated for in a different way. With the drive device 10, a particularly advantageous degree of tolerance compensation can now be implemented, and indeed both in the radial direction and in the axial direction. Thus, the shafts can be mounted on the housing parts 28 and 30 formed separately from one another, without the housing parts 28 and 30 having to be produced with an excessively cost-intensive degree of accuracy. The bearing devices 18 and 52 and the axial bearing 48 enable a particularly simple and compact as well as statically determined bearing, in particular of the planetary gear set 24.

LIST OF REFERENCE CHARACTERS

10 Drive device
12 Drive unit
14 Driveshaft
16 Housing
18 Bearing device
20 Bearing
22 Bearing
24 Planetary gear set
26 Receiving chamber
28 Housing part
30 Housing part
32 Separating plane
34 Sun gear
36 Sun shaft
38 Axis of rotation
40 Hollow gear
42 Planetary support
44 Planetary gear
46 First connection device
48 Axial bearing
50 Roller bearing
52 Bearing device
54 Bearing
56 Bearing casing
58 Outer ring
60 Inner ring
62 Roller body
64 Grouping
66 Securing ring
68 Securing plate
70 Second connection device
72 Support plate
74 Screw
76 Groove
78 Lug

What is claimed is:
1. A drive device (10) for a motor vehicle, comprising:
a drive unit (12) which has a driveshaft (14) via which a torque from the drive unit (12) can be provided;
a housing (16);
a planetary gear set (24) disposed in the housing (16), wherein the planetary gear set has a sun gear (34);

a first connection device (46) allowing relative movements, running in an axial direction of the driveshaft (14), between the sun gear (34) and the driveshaft (14), via which the sun gear (34) is drivable by the driveshaft (14);

an axial bearing (48) having a roller bearing (50) for axially mounting the sun gear (34);

wherein the axial bearing (48) is disposed in the axial direction between the drive unit (12) and the planetary gear set (24); and wherein the axial bearing (48) has a bearing casing (56) formed separately from the housing (16), wherein the roller bearing (50) has an outer ring (58), an inner ring (60), and a roller body (62) disposed between the outer ring (58) and the inner ring (60), wherein the roller bearing (50) is supported in the axial direction via the outer ring (58) of the roller bearing (50) on the bearing casing (56) of the axial bearing (48), wherein the outer ring (58) is non-rotationally connected to the bearing casing (56), and wherein the bearing casing (56) is connected axially fixedly to the housing (16).

2. The drive device (10) according to claim 1 further comprising a second connection device (70), wherein the bearing casing (56) is secured at least indirectly on the housing (16) via the second connection device (70) and wherein the second connection device (70) allows relative movements, running in a radial direction, between the bearing casing (56) and the housing (16).

3. The drive device (10) according to claim 1 further comprising a support element (72), wherein the support element (72) is formed separately from the housing (16) and separately from the bearing casing (56) and is fixed at least indirectly on the housing (16) and wherein the bearing casing (56) is axially fixed on the support element (72).

4. The drive device (10) according to claim 1, wherein the outer ring (58) is supported directly on the bearing casing (56) in a radial direction and/or directly on the bearing casing (56) in the axial direction.

5. A drive device (10) for a motor vehicle, comprising:
a drive unit (12) which has a driveshaft (14) via which a torque from the drive unit (12) can be provided;
a housing (16);
a planetary gear set (24) disposed in the housing (16), wherein the planetary gear set has a sun gear (34);
a first connection device (46) allowing relative movements, running in an axial direction of the driveshaft (14), between the sun gear (34) and the driveshaft (14), via which the sun gear (34) is drivable by the driveshaft (14);
an axial bearing (48) having a roller bearing (50) for axially mounting the sun gear (34);
wherein the axial bearing (48) is disposed in the axial direction between the drive unit (12) and the planetary gear set (24);
a bearing casing (56) formed separately from the housing (16) on which the roller bearing (50) is supported in the axial direction via an outer ring (58) of the roller bearing (50) non-rotationally connected to the bearing casing (56), wherein the bearing casing (56) is connected axially fixedly to the housing (16); and
a support element (72), wherein the support element (72) is formed separately from the housing (16) and separately from the bearing casing (56) and is fixed at least indirectly on the housing (16) and wherein the bearing casing (56) is axially fixed on the support element (72);
wherein a hollow gear (40) of the planetary gear set (24) is fixedly connected to the support element (72).

6. The drive device (10) according to claim 5, wherein the hollow gear (40) and the support element (72) are formed integrally.

7. A drive device (10) for a motor vehicle, comprising:
a drive unit (12) which has a driveshaft (14) via which a torque from the drive unit (12) can be provided;
a housing (16);
a planetary gear set (24) disposed in the housing (16), wherein the planetary gear set has a sun gear (34);
a first connection device (46) allowing relative movements, running in an axial direction of the driveshaft (14), between the sun gear (34) and the driveshaft (14), via which the sun gear (34) is drivable by the driveshaft (14);
an axial bearing (48) having a roller bearing (50) for axially mounting the sun gear (34);
wherein the axial bearing (48) is disposed in the axial direction between the drive unit (12) and the planetary gear set (24);
a bearing casing (56) formed separately from the housing (16) on which the roller bearing (50) is supported in the axial direction via an outer ring (58) of the roller bearing (50) non-rotationally connected to the bearing casing (56), wherein the bearing casing (56) is connected axially fixedly to the housing (16); and
a securing plate (68) and a support element (72), wherein the securing plate (68) is formed separately from the bearing casing (56) and separately from the housing (16) and is fixed at least indirectly on the housing (16), wherein via the securing plate (68) the bearing casing (56) is secured against relative rotations carried out in relation to the housing (16), and wherein the securing plate (68) is fixed on the support element (72).

8. The drive device (10) according to claim 7 further comprising a second connection device (70), wherein the second connection device (70) secures the bearing casing (56) to the securing plate (68) on the support element (72).

9. The drive device (10) according to claim 7, wherein the bearing casing (56) has grooves (76) and the securing plate (68) has lugs (78) which engage in the grooves (76).

* * * * *